United States Patent [19]

Farkas

[11] 4,351,145

[45] Sep. 28, 1982

[54] COMBO HAND RAKE

[75] Inventor: Peter E. Farkas, La Puente, Calif.

[73] Assignees: Laszlo Szentkiralyi; Istvan Csoke, both of Venice, Calif.; a part interest to each

[21] Appl. No.: 230,865

[22] Filed: Feb. 2, 1981

[51] Int. Cl.³ .............................................. A01D 7/00
[52] U.S. Cl. ................................ 56/400.16; 56/400.19
[58] Field of Search ........... 56/400.16, 400.17, 400.08, 56/400.01, 400.12, 400.18

[56] References Cited

U.S. PATENT DOCUMENTS

| | | | |
|---|---|---|---|
| 157,439 | 12/1874 | Brinckerhoff | 56/400.16 |
| 349,703 | 9/1886 | Fisher | 56/400.08 |
| 1,116,121 | 11/1914 | Reidt | 56/400.1 |
| 1,132,334 | 3/1915 | Granger | 56/400.08 |
| 1,474,650 | 11/1923 | Storr | 294/52 |
| 2,883,820 | 4/1959 | Bissell | 56/400.17 |
| 3,264,810 | 8/1966 | Lowell | 56/400.16 |
| 3,332,223 | 7/1964 | Polisso | 56/400.17 |
| 4,150,528 | 4/1979 | Rendin | 56/400.16 |

Primary Examiner—Paul J. Hirsch
Attorney, Agent, or Firm—Thomas I. Rozsa

[57] ABSTRACT

The present invention relates to a hand rake comprised of multiple rows of teeth; one fixed large set of teeth spaced wide apart and one smaller movable set of teeth which come into use in the raking path in the spaces between the large set of teeth, to allow the user to rake both large and small objects, either at the same time or at different times.

10 Claims, 4 Drawing Figures

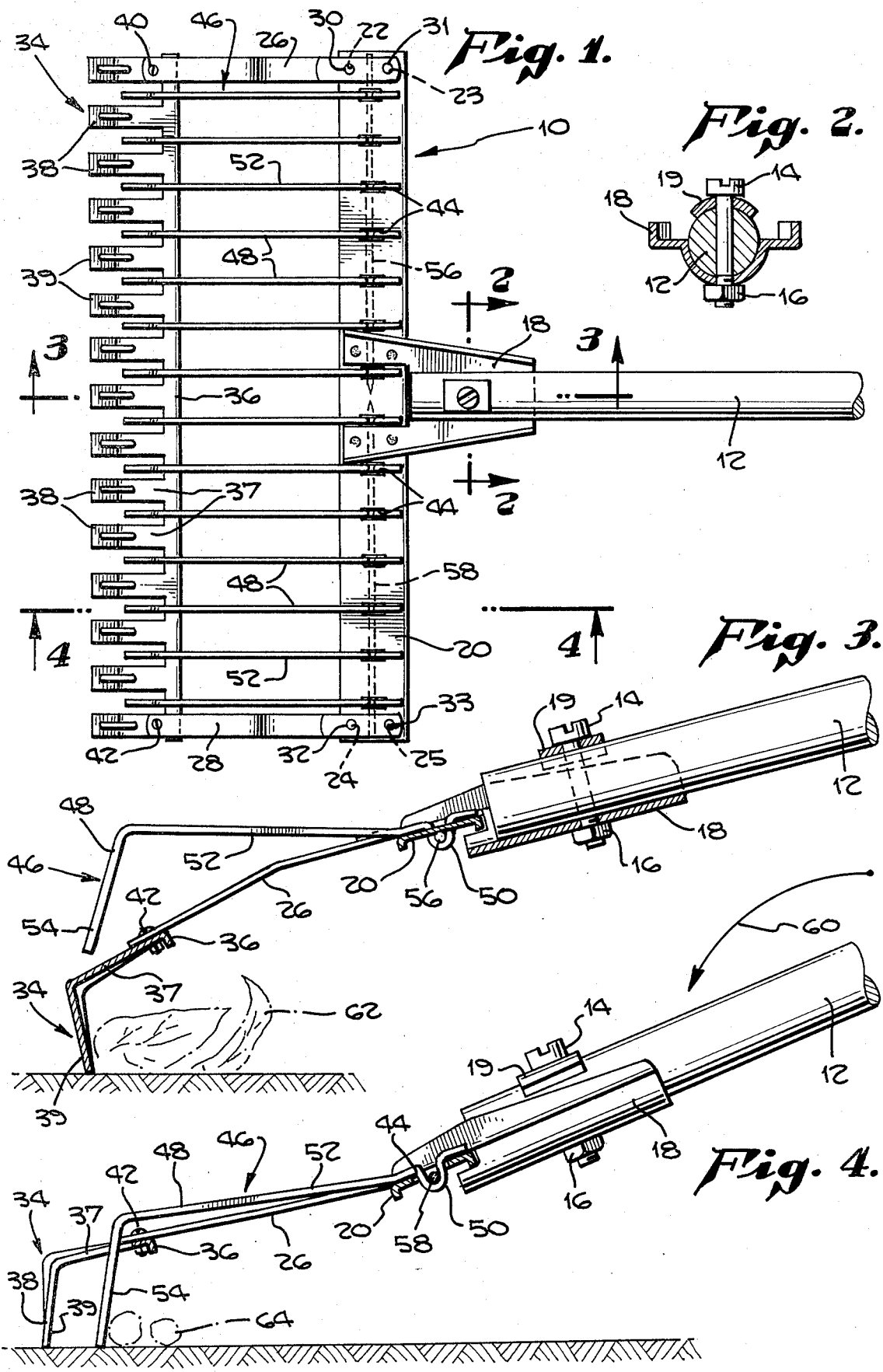

COMBO HAND RAKE

BACKGROUND OF THE INVENTION

A rake is a toothed implement which is used for drawing together loose material or making a surface loose. The hand held rake is an ancient farming and gardening tool which has been in use for many centuries.

The daisy rake was used during the nineteenth century to rip the heads from daisies, buttercups, dandelions, and other plants that flowered in short grassland. The prongs or teeth of this rake were in a single row and were made of thin plate iron. There was only a slight gap between the top edge of each tooth where they were joined to the head. The farmer took this rake in both hands and proceeded to walk backwards or sideways pulling the rake across the surface of grassland. Grass and other growth caught up in the spaces between the teeth would normally pull through without damage, but should the growth be in flower, then its head was too large to pass through the space between the teeth and was ripped from its stem.

The hand hay rake was constructed with a willow or ash wood handle about eight feet long, which forked to support a head made of harder wood. The wooden teeth were short and had rounded ends in order not to disturb roots and stubble, and were screwed into the head to prevent their coming loose or dropping out. In this rake there were wide spaces between the teeth. As with the daisy rake, all of the teeth were attached to the head in a single row.

The binding rake was used after the scythe or sickle had done its work and was brought into use when the crop had lain for a sufficient time and was thoroughly dry. Its handle was shorter than that of the hay rake but its head was wider and the iron teeth longer, being curved under near to the point. The rake was used by the laborer to collect enough corn to form a sheaf. The laborer would take the rake in both hands and pull it towards himself to collect the corn. Once again, there were wide spaces between the teeth and the teeth were attached to the head in a single row.

The stubble rake was used for gleaning stubble of any cut corn that might have been passed over. The teeth were set close together and were curved under near to the point, so as not to pierce or disturb the soil. Once again, all of the teeth were in a single row.

The drag rake was similar in appearance to the stubble rake except that its two wooden handles were brought together at the end and braced with a bar to form the shape of the letter A. The teeth were also curved under near the point and were attached to the head in a single row.

An examination of the construction of rakes in the prior art discloses that many of the innovations came in the handle of the rake. Rakes had a single handle or a double handle with the spread portion of the handle designed in different styles. Some were curved while others formed the shape of the letter A. The variations in the design of the teeth or prongs in the head of the rake consisted of using wooden teeth or metal teeth, either long or short, either straight or curved near to the tip of the point, and spread either close together or with varying distances between the teeth. In every case, the teeth were attached to the head in a single row and the teeth were not movable relative to the handle, to the head, or to each other.

Present day hand gardening rakes have many similarities to the rakes described above. The handle is usually made of wood or metal and is either attached to the head through a screw or bolt, is held in place by bands in the head, or is made of one piece construction with the head. The head is usually a flat piece of metal placed perpendicular to the handle. The teeth or prongs are several inches long, are straight or else curved near to the tip, are usually made of wood or metal and are spaced anywhere from an eighth of an inch to an inch or more apart. The teeth are either of one piece construction with the head or else are rigidly attached to the head, either by being screwed, cemented or welded to the head. In every case, the teeth are arranged in a single row. In every case, the teeth are not movable relative to the handle, to the head, or to each other.

When used to rake in the garden, the rake as described above can be used efficiently to rake leaves or litter. The rake is not efficient in raking up small stones or objects which are small enough to fall between the teeth. The teeth of most conventional garden rakes are of light construction and are therefore ineffective in moving and raking heavy objects. The rakes are also ineffective in weeding dandelions, mushrooms, and other garden pest flowers.

When used in farming, the conventional hand rake is effective for gathering loose elements such as grass or hay. However, the disadvantages described above for use in the garden are also applicable to the use of the rake in farming.

SUMMARY OF THE PRESENT INVENTION

It has been discovered, according to the present invention, that use of multiple rows of teeth in a rake enables the home gardener, farmer, stableboy or other laborer to rake a far greater variety of objects than can be raked by the present day conventional rakes or by historical rakes disclosed in the prior art. One large set of teeth, spaced wide apart, allows the user to rake leaves, litter, and other large objects. The second, smaller set of teeth, which come into use in the spaces between the large set of teeth, allows the user to rake smaller objects such as stones which would be too small to be raked by the larger set of teeth.

It has also been discovered, according to the present invention, that by enabling the second set of teeth to be movable relative to the first set of teeth and relative to the handle as well, the second set of teeth can be placed out of the way so as not to interfere with the raking action of the first set of teeth and can then be lowered to rake up additional matter missed by the first set of teeth; all with a minimum of effort on the part of the user and without requiring the user to change teeth or rake heads.

It has further been discovered, according to the present invention, that by making each set of teeth removable from the head of the rake, a broken tooth can be easily replaced. In this way, it is not necessary to discard the rake because of a few broken teeth and the user will not be forced to use a rake with substantially decreased efficiency due to the broken teeth.

It has additionally been discovered, according to the present invention, that by making at least one set of teeth and the head of the rake in heavy gauge metal, the rake can be used to move objects substantially heavier than can be moved by conventional rakes.

It is therefore an object of the present invention to provide a means for raking a multiplicity of objects, regardless of size or weight.

It is a further object of the present invention to provide a rake with multiple rows of teeth; one large set of teeth spaced wide apart and one smaller set of teeth which come into use in the spaces between the large set of teeth, to allow the user to rake both large and small objects either at the same time or at different times.

It is still another object of the present invention to provide a rake with multiple rows of teeth wherein one row of teeth is movable relative to the other row of teeth, the head of the rake, and the handle, so that the multiple rows of teeth can be used independently of each other or in conjunction with one another.

It is still a further object of the present invention to provide a rake with teeth which are removable from the head of the rake, so that a broken tooth may be easily replaced.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

FIG. 1 is a top plan view of the Combo Hand Rake.

FIG. 2 is a cross-sectional view taken along line 2—2 of FIG. 1.

FIG. 3 is a cross-sectional view taken along line 3—3 of FIG. 1.

FIG. 4 is a cross-sectional view taken along line 4—4 of FIG. 1.

DETAILED DESCRIPTION OF THE PREFERRED EMBODIMENT

With reference to the drawings of the invention in detail and more particularly to FIG. 1, there is shown at 10 the Combo Hand Rake. A portion of the handle of the rake is shown at 12. A hole in the handle enables it to be removably but rigidly attached to the connecting plate 18 in the head 20. The cross-sectional view in FIG. 2 shows the bolt 14 running through a retaining plate 19, the center of handle 12, and through connecting plate 18. It is finally secured by nut 16. The connecting plate 18 is rigidly secured to the head 20 by welding or comparable permanent attachment means. In practice, the connecting plate and the head are both made of metal such as stainless steel.

The rake head 20 contains spaced holes 22 and 23 adjacent the right edge and spaced holes 24 and 25 adjacent the left edge. Attached at each end of the head 20 are elongated connecting bars 26 and 28 respectively. Bar 26 is connected to the right side of head 20 by rivets 30 and 31, and bar 28 is connected to the left side of the head 20 by rivets 32 and 33. As shown in FIG. 3, each connecting bar is bent at its central portion to give its forward portion a downward slope. In practice, the connecting bars are made of stainless steel.

The first row of teeth assembly is shown at 34 in FIG. 1. The main body 36 of the teeth supports the individual tooth members 38. In practice, the main body 36 of the teeth and the individual tooth members 38 are of one piece construction. It is also within the scope of the present invention to have each tooth 38 individually welded to the main body 36 or individually screwed on to the main body 36. Each tooth is bent at approximately ninety (90) degrees and consists of a horizontal section 37 and a vertical section 39. The entire first row of teeth assembly 34 is attached to the end of connecting bars 26 and 28 by means of screws 40 and 42 respectively. The screws pass through holes near the end of the connecting bars and at the base of the outermost teeth and are secured by nuts (not shown). In this way, the first row of teeth assembly can be removed and replaced should any of the teeth break. In another embodiment, the entire first row of teeth assembly 34 is attached to the end of connecting bars 26 and 28 by means of rivets located in the same place as screws 40 and 42. In this embodiment, the first row of teeth assembly 34 is permanently attached and cannot be removed to replace the assembly if one or more teeth 38 are broken. Therefore, removable attachment through screws would be the preferred embodiment. Regardless of the method of attachment, the first row of teeth assembly 34 is not movable relative to the head 20 or to the handle 12. In the preferred embodiment, the main body 36 and the individual teeth 38 are made of stainless steel.

As shown in FIG. 1, the rake head 20 contains a multiplicity of holes 44. These holes are used to accommodate the second row of teeth assembly 46. An individual tooth 48 of the second row of teeth assembly 46 is shown in FIG. 3. Although made of one piece construction, the tooth 48 is composed of three (3) sections; a first semicircular connecting portion 50, a second elongated portion 52, and a third elongated portion 54 extending transverse to the second elongated portion 52. The second elongated portion 52 is raised above the first portion 50. The semicircular connecting portion 50 is designed to fit into the holes 44 and accommodate a connecting dowel. Each tooth 48 is movably connected to the head 20 by connecting dowel 56 on the right side of the head. Each tooth 48 is movably connected to the head 20 by connecting dowel 58 on the left side of the head. In the preferred embodiment, the individual teeth 48 are made of stainless steel and the connecting dowel is also made of stainless steel. The teeth in the second row of teeth assembly 46 are much thinner and longer than the teeth in the first row of teeth assembly 34, and are designed to come down in the spaces between the teeth in the first row of teeth assembly 34. In the event that one or more teeth in the second row of teeth assembly is broken, it can be easily replaced by removing the connecting dowel and lifting the broken tooth out of its hole. The connecting dowels 56 and 58 are designed so that the teeth in the second row of teeth assembly 46 fit snugly into the head 20 while at the same time allowing the teeth to be moved downward into raking position by a counterclockwise tilting force shown as 60 in FIG. 4 applied to the rake handle 12. The rake handle 12 is tilted by raising the back end and lowering the forward end.

The uses to which the Combo Hand Rake can be put are illustrated in FIG. 3 and FIG. 4. In its normal resting position, the teeth in the second row of teeth assembly 46 are raised up and out of the way of the raking path. If the user intends to rake larger objects such as leaves, illustrated at 62 in FIG. 3, only the teeth in the first row of teeth assembly 34 are needed and the raking is achieved by the user pulling the leaves toward him with teeth 38. The rake can also be used in this fashion to rake heavier objects such as rocks. If the user intends to rake smaller objects which would fall in the spaces between the teeth 38, then the user applies a counterclockwise force to the handle as shown in FIG. 4. This will cause the second row of teeth assembly 46 to move downward into the raking path and gather up the small stones 64 or comparable small objects. In the event a stone or other object is lodged between the two rows of teeth, the rake 10 is simply turned ninety (90) degrees and hit against the ground. The object will then fall out and the user can continue raking. By twisting the rake with the second row of teeth in its lowered position, garden pests such as mushrooms and dandelions can be removed and raked away.

While the head member, it component parts and both rows of teeth have been described as being made of steel in the preferred embodiment, the scope of the present invention also includes the use of wood, plastic and other materials for the head member, its component parts, and either or both rows of teeth.

A novel feature of the present invention is the use of multiple rows of teeth; one large set of teeth spaced wide apart and one smaller set of teeth which come into use in the raking path in the spaces between the large set of teeth, to allow the user to rake both large and small objects, either at the same time or at different times.

A further novel feature of the present invention is the use of a rake with multiple rows of teeth wherein one row of teeth is movable relative to the other row of teeth, the head of the rake and the handle, so that the multiple rows of teeth can be used independently of each other or in conjunction with one another.

An additional novel feature of the present invention is the use of a rake with removable teeth so that a broken tooth can be easily and inexpensively replaced.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modifications in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A hand rake comprising:
   a. an elongated handle;
   b. an elongated head member removably attached at the central portion of its longitudinal axis to one end of and perpendicular to said elongated handle;
   c. a first elongated connecting bar rigidly attached at one end to one lateral edge of said elongated head member;
   d. a second elongated connecting bar rigidly attached at one end to the second lateral edge of said elongated head member;
   e. a first row of teeth assembly consisting of a multiplicity of parallel teeth spaced apart from each other in a single row;
   f. said first row of teeth assembly spaced apart from but removably and rigidly attached adjacent its lateral edges to said elongated head member by said first and second connecting bars respectively, such that the multiplicity of teeth in said first row of teeth assembly do not move relative to said elongated head member and said handle;
   g. a second row of teeth assembly consisting of a multiplicity of parallel elongated teeth spaced apart from each other;
   h. said teeth in said second row of teeth assembly removably and movably attached to said head member such that the elongated teeth of the second row of teeth assembly lie in a plane above the teeth in the first row of teeth assembly and are capable of movement relative to said first row of teeth assembly such that the teeth in the second row of teeth assembly can be placed into operation in the spaces between the teeth in the first row of teeth assembly; and
   i. wherein a normal motion of the rake only allows the teeth in said first row of teeth assembly to come in contact with the object to be raked while a counterclockwise tilting force exerted on said handle causes the teeth of said second row of teeth assembly to come down in a plane parallel to the teeth of the first row of teeth assembly and within the spaces between the teeth of the first row of teeth assembly such that both rows of teeth can come in contact with the object to be raked.

2. A hand rake as defined in claim 1 wherein:
   a. said elongated head member is made of stainless steel;
   b. said first and second elongated connecting bars are made of stainless steel;
   c. the multiplicity of teeth in said first row of teeth assembly are made of stainless steel; and
   d. the multiplicity of teeth in said second row of teeth assembly are made of stainless steel.

3. A hand rake as defined in claim 1 wherein:
   a. said multiplicity of parallel teeth in said first row of teeth assembly are short and wide; and
   b. said multiplicity of parallel teeth in said second row of teeth assembly are narrow.

4. A hand rake as defined in claim 1 wherein:
   a. said elongated head member is made of plastic;
   b. said first and second elongated connecting bars are made of plastic;
   c. the multiplicity of teeth in said first row of teeth assembly are made of plastic; and
   d. the multiplicity of teeth in said second row of teeth assembly are made of plastic.

5. A hand rake comprising:
   a. an elongated handle;
   b. an elongated head member transversely disposed to said elongated handle;
   c. a connecting plate;
   d. said connecting plate rigidly attached to said elongated head member at the central portion of said elongated head member;
   e. said connecting plate removably attached near one end of said handle such that the longitudinal axis of said elongated head member is perpendicular to the longitudinal axis of said elongated handle;
   f. a first elongated connecting bar rigidly attached at one end adjacent the edge of said elongated head member such that the longitudinal axis of said first elongated connecting bar is perpendicular to the longitudinal axis of said elongated head member;

g. a second elongated connecting bar rigidly attached at one end adjacent the opposite edge of said elongated head member such that the longitudinal axis of said second elongated connecting bar is perpendicular to the longitudinal axis of said elongated head member;

h. an elongated first row of teeth assembly rigidly and removably attached to said first elongated connecting bar and to said second elongated connecting bar such that the elongated plane of the first row of teeth assembly lies parallel to said elongated head member and spaced apart from it by approximately the length of said first elongated connecting bar;

i. said elongated first row of teeth assembly consisting of an elongated base, a multiplicity of parallel tooth members spaced apart from each other and all formed in a unitary construction as part of the elongated first row of teeth assembly, wherein each of said tooth members contain a first portion and a second portion;

j. said first portion of each of said tooth members lying perpendicular to the longitudinal axis of the base and said second portion of each of said tooth members extending transverse to the first portion;

k. said head member containing a multiplicity of holes spaced apart and extending along its longitudinal axis such that the holes are aligned with the central point of the spaces between each tooth member in said elongated first row of teeth assembly;

l. a second row of teeth assembly wherein each tooth consists of a first semicircular portion, a second elongated portion raised slightly above the first semi-circular portion, and a third elongated portion extending transverse to said second elongated portion, with all three portions contained in a unitary structure;

m. the first semicircular portion of each tooth of said second row of teeth assembly fitted within a corresponding one of said multiplicity of holes in said head member such that the second elongated portion of each tooth extends in the direction of said first and second elongated connecting bars and the end of each second elongated portion and each third elongated portion of each tooth are within the central area of said spaces between each tooth member in said elongated first row of teeth assembly;

n. each tooth of said second row of teeth assembly removably and movably connected to said head member by a dowel extending through each semi-circular first portion of each tooth and lying between each semicircular first portion and the head member such that each of said teeth are parallel and lie in a plane raised above the first row of teeth assembly; and o. wherein a normal motion of the rake only allows the teeth in said first row of teeth assembly to come in contact with the object to be raked while a counterclockwise tilting force exerted on said handle causes the teeth of said second row of teeth assembly to come down in a plane parallel to the teeth of the first row of teeth assembly and within the spaces between the teeth of the first row of teeth assembly such that both rows of teeth can come in contact with the object to be raked.

6. A hand rake as defined in claim 5 wherein:
a. said elongated head member is made of stainless steel;
b. said connecting plate is made of stainless steel;
c. said first and second elongated connecting bars are made of stainless steel;
d. the multiplicity of teeth in said first row of teeth assembly are made of stainless steel;
e. the multiplicity of teeth in said second row of teeth assembly are made of stainless steel; and
f. said dowel is made of stainless steel.

7. A hand rake as defined in claim 5 wherein:
a. said multiplicity of parallel tooth members of said first row of teeth assembly are short and wide; and
b. said multiplicity of tooth members of said second row of teeth assembly are narrow.

8. A hand rake as defined in claim 5 wherein:
a. said elongated head member is made of plastic;
b. said connecting plate is made of plastic;
c. said first and second elongated connecting bars are made of plastic;
d. the multiplicity of teeth in said first row of teeth assembly are made of plastic;
e. the multiplicity of teeth in said second row of teeth assembly are made of plastic; and
f. said dowel is made of plastic.

9. A hand rake comprising:
a. an elongated handle;
b. an elongated head member removably attached at the central portion of its longitudinal axis to one end of and perpendicular to said elongated handle;
c. a first elongated connecting bar rigidly attached at one end to one lateral edge of said elongated head member;
d. a second elongated connecting bar rigidly attached at one end to the second lateral edge of said elongated head member;
e. a first row of teeth assembly consisting of a multiplicity of parallel teeth spaced apart from each other in a single row;
f. said first row of teeth assembly spaced apart from but irremovably and rigidly attached adjacent its lateral edges to said elongated head member by said first and second connecting bars respectively, such that the multiplicity of teeth in said first row of teeth assembly do not move relative to said elongated head member and said handle;
g. a second row of teeth assembly consisting of a multiplicity of parallel elongated teeth spaced apart from each other;
h. said teeth in said second row of teeth assembly removably and movably attached to said head member such that the elongated teeth of the second row of teeth assembly lie in a plane above the teeth in the first row of teeth assembly and are capable of movement relative to said first row of teeth assembly such that the teeth in the second row of teeth assembly can be placed into operation in the spaces between the teeth in the first row of teeth assembly; and
i. wherein a normal motion of the rake only allows the teeth in said first row of teeth assembly to come in contact with the object to be raked while a counterclockwise tilting force exerted on said handle causes the teeth of said second row of teeth assembly to come down in a plane parallel to the teeth of the first row of teeth assembly and within the spaces between the teeth of the first row of teeth assembly such that both rows of teeth can come in contact with the object to be raked.

10. A hand rake comprising:

a. an elongated handle;
b. an elongated head member transversely disposed to said elongated handle;
c. a connecting plate;
d. said connecting plate rigidly attached to said elongated head member at the central portion of said elongated head member;
e. said connecting plate removably attached near one end of said handle such that the longitudinal axis of said elongated head member is perpendicular to the longitudinal axis of said elongated handle;
f. a first elongated connecting bar rigidly attached at one end adjacent the edge of said elongated head member such that the longitudinal axis of said first elongated connecting bar is perpendicular to the longitudinal axis of said elongated head member;
g. a second elongated connecting bar rigidly attached at one end adjacent the opposite edge of said elongated head member such that the longitudinal axis of said second elongated connecting bar is perpendicular to the longitudinal axis of said elongated head member;
h. an elongated first row of teeth assembly rigidly and irremovably attached to said first elongated connecting bar and to said second elongated connecting bar such that the elongated plane of the first row of teeth assembly lies parallel to said elongated head member and spaced apart from it by approximately the length of said first elongated connecting bar;
i. said elongated first row of teeth assembly consisting of an elongated base, a multiplicity of parallel tooth members spaced apart from each other and all formed in a unitary construction as part of the elongated first row of teeth assembly, wherein each of said tooth members contain a first portion and a second portion;
j. said first portion of each of said tooth members lying perpendicular to the longitudinal axis of the base and said second portion of each of said tooth members extending transverse to the first portion;
k. said head member containing a multiplicity of holes spaced apart and extending along its longitudinal axis such that the holes are aligned with the central point of the spaces between each tooth member in said elongated first row of teeth assembly;
l. a second row of teeth assembly wherein each tooth consists of a first semicircular portion, a second elongated portion raised slightly above the first semicircular portion, and a third elongated portion extending transverse to said second elongated portion, with all three portions contained in a unitary structure;
m. the first semicircular portion of each tooth of said second row of teeth assembly fitted within a corresponding one of said multiplicity of holes in said head member such that the second elongated portion of each tooth extends in the direction of said first and second elongated connecting bars and the end of each second elongated portion and each third elongated portion of each tooth are within the central area of said spaces between each tooth member in said elongated first row of teeth assembly;
n. each tooth of said second row of teeth assembly removably and movably connected to said head member by a dowel extending through each semicircular first portion of each tooth and lying between each semicircular first portion and the head member such that each of said teeth are parallel and lie in a plane raised above the first row of teeth assembly; and
o. wherein a normal motion of the rake only allows the teeth in said first row of teeth assembly to come in contact with the object to be raked while a counterclockwise tilting force exerted on said handle causes the teeth of said second row of teeth assembly to come down in a plane parallel to the teeth of the first row of teeth assembly and within the spaces between the teeth of the first row of teeth assembly such that both rows of teeth can come in contact with the object to be raked.

* * * * *